March 28, 1939.  J. C. CROWLEY  2,152,375

CHUCK CLIP

Filed March 10, 1937

INVENTOR.
JOHN C. CROWLEY
BY Kwis Hudson & Kent
ATTORNEYS

Patented Mar. 28, 1939

2,152,375

UNITED STATES PATENT OFFICE 2,152,375

CHUCK CLIP

John C. Crowley, Cleveland Heights, Ohio, assignor to The Dill Manufacturing Company, Cleveland, Ohio, a corporation of Ohio Application March 10, 1937, Serial No. 130,050

5 Claims. (Cl. 284—17)

This invention relates to an air chuck, and particularly to an air chuck adapted to be secured to an air hose and provided with means for maintaining the chuck, when applied to a valve stem of an inflatable article such as the valve stem of the inner tube of a pneumatic tire, in the proper connecting position on the stem.

An object of the invention is to provide in an air chuck means for maintaining the chuck in position upon a valve stem with the proper airtight connection therebetween, and which is of simple construction, permits the ready application and removal of the chuck to and from the valve stem, efficiently maintains the chuck in position upon the stem, can be readily adapted for use with different forms of air chucks, and is of sturdy and strong construction.

A further and more specific object is to provide means in an air chuck, such as specified in the object above mentioned, which means includes a segmental portion adapted to engage the threads of a valve stem and which is normally held in thread engaging position but removable from such position while the chuck is being applied to and removed from the valve stem.

Additional and further objects of the invention will become apparent hereinafter during the following detailed description of an embodiment thereof.

Referring now to the drawing illustrating the said embodiment of the invention,

Figure 1:
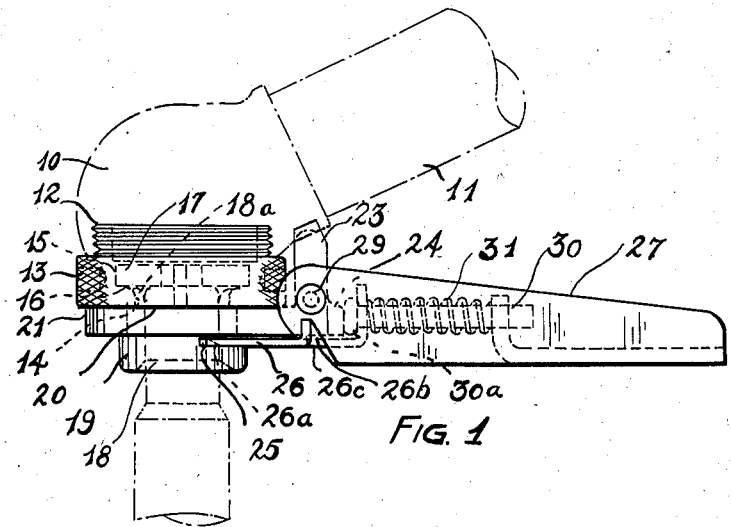
Fig. 1 illustrates the invention embodied in an air chuck and the chuck in turn applied to a valve stem, the head of the chuck and the valve stem being indicated by dash lines and the portion of the chuck embodying the invention being shown in elevation.
Figure 2:
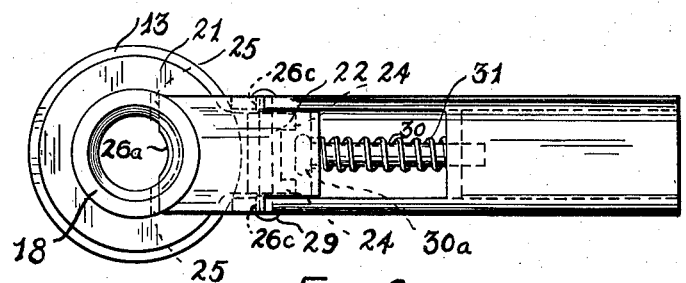
Fig. 2 is a bottom plan view of the chuck shown in Fig. 1.
Figures 3, 4:
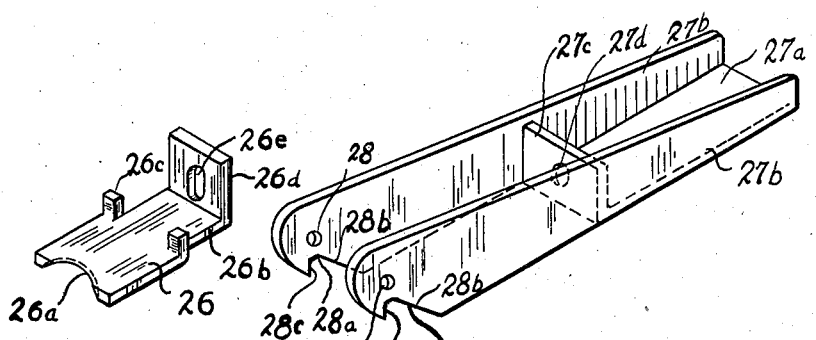
Figs. 3 and 4 are detail perspective views of certain portions of the chuck.

Referring to the drawing and particularly to Fig. 1, the chuck will be seen to comprise a head portion 10, preferably angular as shown, to facilitate the application of the chuck to a valve stem. The head portion 10 is connected in any desired manner to an air hose 11 and, as will be well understood in the art, is provided with a bore (not shown) for conducting the air from the hose 11 through the chuck to the valve stem. The head 10 is provided with a threaded counterbore into which screws the externally threaded reduced extension 12 of a nut 13 that has a knurled exterior and may be provided with spanner wrench sockets, if desired.

The nut 13 is provided with a bore 14 concentrically arranged with respect to and communicating with an enlarged counterbore 15 providing within the nut a shoulder 16. When the nut is screwed into the head 10 a gasket 17 supported by the shoulder 16 is clamped in position and is adapted to engage the end of the valve stem when the chuck is applied thereto to form a seal therewith, as will be well understood in the art. A tubular member 18 having a bore therethrough for receiving the end of the valve stem is provided intermediate its ends with an annular shoulder 19, while spaced upwardly from the shoulder 19 said member is provided with a second annular shoulder 20 engaging the lower side of the nut 13. Beyond the annular shoulder 20 the wall of the member 18 is of reduced cross-section to provide a relatively thin annular portion 18a extending into the nut and peened over at its end upon the shoulder 16, as clearly shown in Fig. 1, to connect the member to the nut with a swivel connection. Mounted between the shoulder 19 of the member 18 and the underside of the nut 13 is a ring 21 that is provided at its circumference with an outwardly extending lug 22 from which projects upwardly an arm 23 that engages the head 10. The lug 22 on one end thereof is provided with spaced protuberances 24 for a purpose later to be referred to. The member 18 on the same side of the chuck as is the projection or lug 22 on the ring 21 is provided with an arcuate opening 25 through which slidably extends a plate member 26, the end of which has an arcuate recess 26a formed therein and adapted to interfit with the usual threads on the end of the valve stem when the chuck is applied to the stem as will later be pointed out. The plate member 26 is reduced in width adjacent its end opposite to the recess 26a, as indicated at 26b, the width of the reduced portion 26b being substantially the width of the lug 22. Ears 26c are struck up from the plate on each side of the reduced portion 26b and are adapted to straddle the lug 22 of the ring 21. The outer end of the reduced portion 26b is turned up at right angles thereto, as indicated at 26d, and said portion 26d has centrally arranged therein an elongated opening or slot 26e. The plate 26 is moved in one direction in the slot 25 by means of an actuating handle indicated generally at 27. This actuating handle is preferably formed from a sheet metal stamping and comprises adjacent its outer end a U-shaped portion including the bottom 27a and parallel side walls 27b, the inner end of the bottom 27a being turned upwardly, as indicated at 27c, and provided with a centrally located opening 27d. The walls 27b project beyond the upturned portion 27c, as clearly indicated in the drawing, and said walls gradually increase in height from end to end of the operating handle. The highest or widest ends of the walls 27b, that is the left hand ends as viewed in the drawing, are provided with aligned openings 28 and straddle the lug 22 at the lower end of the arm 23, a pivot or hinge pin 29 extending through the openings in the walls and through an opening in the lug to pivotally connect the handle to the ring 21. Beneath the openings 28 the walls are provided with downwardly facing substantially V-shaped recesses 28a, the long sides 28b of said recesses being inclined while the short sides 28c thereof are straight. The ears 26c on the plate 26 extend into the recesses 28a, and it will be seen that when the handle 27 is swung upwardly that the straight short sides 28c of the recesses will act upon the ears to move the plate in the slot 25 toward the right, as viewed in the drawing, wherefore the arcuately recessed end 26a of the plate will be withdrawn from the bore through the member 18 and to a position where such end will not engage the threads of the valve stem. A pin 30 extends through the openings 26e and 27d in the plate 26 and handle 27, respectively, said pin being provided with an enlarged head 30a which prevents the pin from pulling out in one direction through the elongated opening 26e, it being noted that said pin has a relatively free clearance in the elongated opening. A coil spring 31 is mounted on the pin and its opposite ends abut the portion 26d of the plate and the portion 27c of the handle and said spring acts to normally urge the plate 26 toward the left to position the recessed end 26a in the bore of the member 18.

When the chuck is applied to a valve stem, as indicated in Fig. 1, the recessed end 26a of the plate 26 will engage and interlock with the usual threads on the reduced nipple of the valve stem and hold the chuck in position on the stem, at which time the handle 27 will be substantially horizontal.

When it is desired to apply the chuck to a valve stem the operator raises the handle 27, whereupon the short straight edges 28c of the recesses 28 positively engage with the ears 26c and retract the plate 26 from its thread engaging position, at which time the chuck can be applied to the nipple of the valve stem. After the chuck has been so applied the handle 27 can be released and since the upward movement of the handle has compressed the spring 31, such spring will act to return the handle to the position shown in Fig. 1, at which time the recessed end 26a of the plate 26 will engage with the threads of the valve stem and lock the chuck in position upon the stem. The space between the protuberances 24 provides clearance for the head 30a of the pin during the swinging movement of the handle.

Although a preferred embodiment of the invention has been illustrated and described herein, it should be understood that the invention is susceptible of various modifications and adaptations within the scope of the appended claims.

Having thus described my invention I claim:

1. An air chuck comprising a chuck head, a sleeve adapted to fit on a valve stem, a member connecting said head and sleeve, slidable means associated with said sleeve for locking the chuck in position upon the valve stem, and means for actuating said slidable means including a ring supported by said sleeve and an operating handle pivoted on said ring and having a portion operatively associated with said slidable means and functioning upon movement of said handle to positively actuate said slidable means in one direction.

2. An air chuck comprising a chuck head, a sleeve adapted to fit on a valve stem and provided with a slot, a member connecting said head and sleeve, means slidable in said slot in said sleeve for locking the chuck in position upon the valve stem and having upturned ears, and means for actuating said slidable means including a ring supported by said sleeve and an operating handle pivoted on said ring and having recessed portions into which said ears extend whereby when said handle is moved said slidable means is slid in one direction.

3. An air chuck comprising a chuck head, a sleeve adapted to fit on a valve stem, a member connecting said head and sleeve, slidable means associated with said sleeve for locking the chuck in position upon a valve stem, and means for actuating said slidable means including a ring supported by said sleeve and having an extension, an operating handle pivoted on said extension and adapted to actuate said slidable member in one direction, and means operatively connected with said handle and said slidable means for actuating the latter in the opposite direction.

4. An air chuck comprising a chuck head, a sleeve adapted to fit on a valve stem, a member connecting said head and sleeve, slidable means associated with said sleeve for locking the chuck in position upon the valve stem, and means for actuating said slidable means including a ring supported by said sleeve, and an operative handle pivoted on said ring and having an operative association with said slidable means, said slidable means and said handle having portions provided with openings, a headed pin supported in said openings of said portions and a coil spring mounted on said pin intermediate said portions and adapted to move said slidable means in one direction.

5. An air chuck comprising a chuck head, a sleeve adapted to fit on a valve stem, a member connecting said head and sleeve, slidable means associated with said sleeve for locking the chuck in position upon the valve stem, and means for actuating said slidable means including a ring supported by said sleeve and having an extension, and an operative handle pivoted on said extension and having an operative association with said slidable means, said slidable means and said handle having portions provided with openings, a headed pin supported in said openings of said portions and a coil spring mounted on said pin intermediate said portions and adapted to move said slidable means in one direction, said extension being provided with spaced protuberances.

JOHN C. CROWLEY.